(12) United States Patent
Gault et al.

(10) Patent No.: US 10,815,105 B2
(45) Date of Patent: Oct. 27, 2020

(54) QUICK CONNECT SYSTEM FOR INDUSTRIAL AND CONSTRUCTION EQUIPMENT

(71) Applicant: Arrow Acquisition, LLC, Lenexa, KS (US)

(72) Inventors: Ross T. Gault, Olathe, KS (US); Terrence S. Melvin, Overland Park, KS (US)

(73) Assignee: ARROW ACQUISITION, LLC, Lenexa, KS (US)

( * ) Notice: Subject to any disclaimer, the term of this patent is extended or adjusted under 35 U.S.C. 154(b) by 0 days.

(21) Appl. No.: 16/442,215

(22) Filed: Jun. 14, 2019

(65) Prior Publication Data
US 2019/0382253 A1 Dec. 19, 2019

Related U.S. Application Data

(60) Provisional application No. 62/685,603, filed on Jun. 15, 2018.

(51) Int. Cl.
*B66F 9/12* (2006.01)
(52) U.S. Cl.
CPC ..................... *B66F 9/12* (2013.01)
(58) Field of Classification Search
CPC ....................................................... B66F 9/12
USPC ................................ 187/237; 414/607, 785
See application file for complete search history.

(56) References Cited

U.S. PATENT DOCUMENTS

| | | | | |
|---|---|---|---|---|
| 1,516,806 A | * | 11/1924 | Amrin | F16B 45/02 294/82.19 |
| 2,999,697 A | * | 9/1961 | Winget | E02F 9/003 280/481 |
| 3,027,033 A | * | 3/1962 | Schuster | B66F 9/12 414/785 |
| 3,325,023 A | * | 6/1967 | Coleman | B66F 9/065 414/724 |
| 3,743,358 A | * | 7/1973 | Guest | E01C 23/092 299/40.1 |

(Continued)

FOREIGN PATENT DOCUMENTS

CA  2416235 A1 * 8/2003 ................ B66F 9/12

OTHER PUBLICATIONS

International Search Report and Written Opinion for PCT/US19/37357 dated Sep. 9, 2019.

*Primary Examiner* — James Keenan
(74) *Attorney, Agent, or Firm* — Husch Blackwell LLP

(57) ABSTRACT

A quick-connect connection system assembly for attaching attachments or tools to industrial and construction equipment for purposes of moving and placing materials and items, particularly heavy items, at varying heights relative to the ground. The connection system can have a mounting mechanism that generally comprises a rotatable latch that can be selectively retained in at least one of an open position and a closed position, including through the use of a magnet coupled with the mounting mechanism. The rotatable latch can be selectively rotated between the open and closed positioned via interaction with a cross member of the industrial equipment and the effect of forces acting upon the rotatable latch member, and with limited interaction by an operator of the industrial equipment.

14 Claims, 17 Drawing Sheets

(56) References Cited

U.S. PATENT DOCUMENTS

| | | | | |
|---|---|---|---|---|
| 3,908,844 A | * | 9/1975 | Duffield | B66F 9/12 414/724 |
| 4,002,256 A | * | 1/1977 | Kroboth | B66F 9/12 414/785 |
| 4,039,220 A | | 8/1977 | Stoops | |
| 4,113,128 A | * | 9/1978 | Foss | B66F 9/12 414/541 |
| 4,221,535 A | * | 9/1980 | Quinn | B66F 9/12 414/667 |
| 4,426,188 A | * | 1/1984 | Wolf | B66F 9/12 294/82.1 |
| 4,497,607 A | * | 2/1985 | Johannson | B66F 9/12 414/664 |
| 4,544,324 A | | 10/1985 | Hornung | |
| 4,850,789 A | * | 7/1989 | Zimmerman | B66F 9/061 414/703 |
| 5,020,843 A | | 6/1991 | Lucas | |
| 5,120,188 A | * | 6/1992 | Harrison | B66F 9/12 414/785 |
| 5,897,288 A | * | 4/1999 | Green | B66F 9/12 187/237 |
| 6,055,774 A | | 5/2000 | Muddiman | |
| 6,163,989 A | | 12/2000 | Kaczmarski et al. | |
| 9,216,883 B2 | * | 12/2015 | Williams | B66F 9/12 |
| 9,624,644 B2 | * | 4/2017 | Waldner | E02F 3/962 |
| 2005/0129494 A1 | * | 6/2005 | Chandler | E02F 3/962 414/607 |
| 2013/0312224 A1 | | 11/2013 | Nommensen et al. | |
| 2013/0315700 A1 | | 11/2013 | Yustus | |
| 2016/0052751 A1 | | 2/2016 | Lauterslager | |

\* cited by examiner

FIG. 5
PRIOR ART
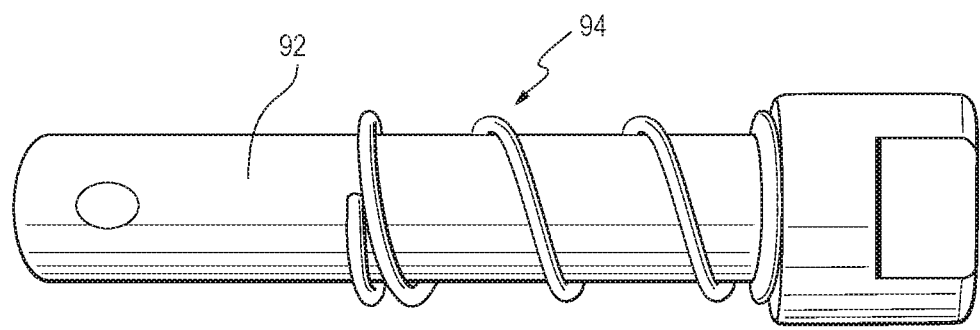
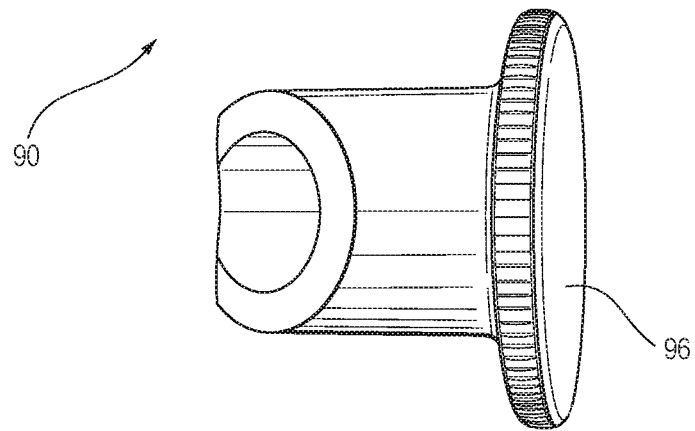

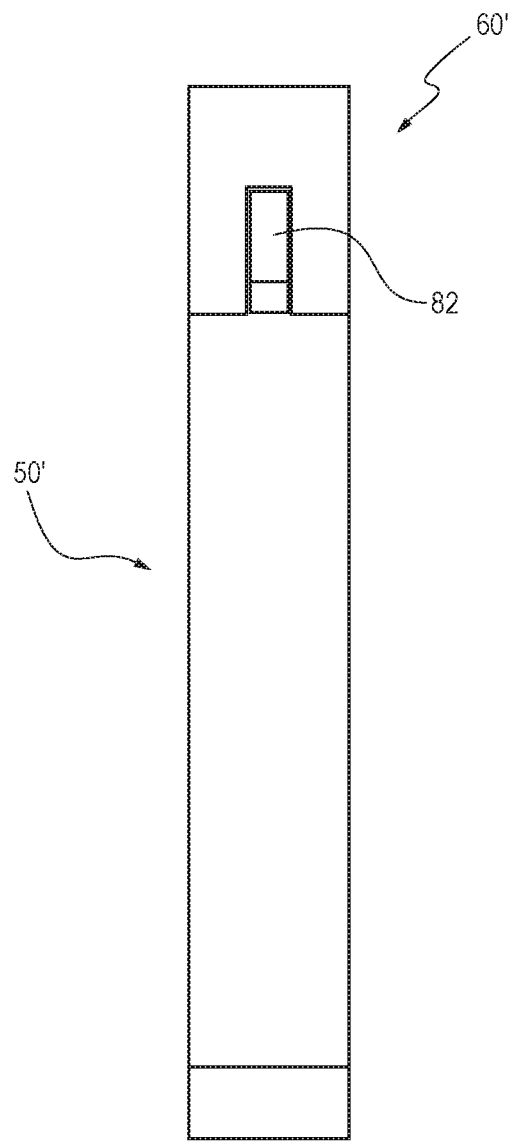

ent Application No. 62/685,603, filed Jun. 15, 2018, to Ross.
QUICK CONNECT SYSTEM FOR INDUSTRIAL AND CONSTRUCTION EQUIPMENT

CROSS-REFERENCE TO RELATED APPLICATIONS

This Application claims priority to U.S. Provisional Patent Application No. 62/685,603, filed Jun. 15, 2018, to Ross. T. Gault and Terrence S. Melvin, entitled "Quick Connect System for Industrial and Construction Equipment,". The entire disclosure, including the specification and drawings, of the above-referenced application is incorporated herein by reference.

FIELD OF INVENTION

The present invention relates generally to industrial and construction equipment, and more particularly to an improved connection system assembly for industrial and construction equipment attachments.

BACKGROUND OF INVENTION

There are a myriad of types of industrial and construction equipment that are designed for lifting, handling, and moving materials, such as forklifts, telehandlers, skid steers, hi-lo vehicles, walkie-rider pallet jacks, and wheel loaders, among a variety of others. These pieces of equipment are generally adapted for moving and placing materials and items, particularly heavy items, at varying heights relative to the ground. Such equipment can be used in a variety of settings, including warehouses, jobsites, and other industrial settings, for lifting a wide range of items, including items stored on pallets. These pieces of equipment typically include attachments or tools, such as forks, buckets, spears, grapples, and the like, mounted thereto that are designed for lifting and moving material and objects. In the case of a forklift, the attachment typically includes a pair forks having generally parallel elongated tines suitable for lifting material and moving it and/or placing it at a desired height. The forks can be fixedly or movably attached to the forklift via a carriage.

Currently known means for mounting attachments to a piece of equipment are not without deficiencies that make them inefficient, dangerous, and/or costly to install or replace. One such problem relates to the fact that with some mounting mechanisms, the mounting and unmounting of the attachment to the equipment must be performed manually, which requires significant interaction by a human operator. This operator-intensive process can demand considerable time and cause unnecessary delays. Further, in the context of industrial and construction applications, additional human presence unnecessarily increases the risk of accident, which, consequently, adversely impacts the overall safety of any given task.

Another problem with known means for mounting an attachment to a piece of equipment is that non-manual mounting mechanisms—that is, mounting mechanisms that require little to no human intervention or operation—for mounting the attachments to the equipment can sacrifice lifting capacity, and be complex, complicated, and/or costly. Further, when employed to retrofit existing equipment, currently known mounting mechanisms comprise several material elements or additional devices, whereas other mounting mechanisms sacrifice loading capacity or are overly complex and expensive.

Accordingly, a need exists for an improved mounting mechanism for mounting attachments to industrial and construction equipment that is less human-intensive while also not sacrificing lifting capacity or increasing cost and complexity.

SUMMARY OF THE INVENTION

One embodiment of the present invention is directed to a mounting mechanism for connecting an attachment to industrial or construction equipment, wherein the mounting mechanism may comprise a hook portion having a proximal end affixed to the attachment and a free distal end. The mounting mechanism may further comprise an opening defined between the distal end of the hook portion and the attachment, and a locking mechanism attached to the distal end of the hook portion, wherein the locking mechanism may include a rotatable latch member. Further, the rotatable latch member may be selectively movable between an open position, so that a cross member connected to the equipment can be received within the opening, and a closed position, so that the cross member is retained within the opening.

The latch member can be pivotably connected or coupled to the hook portion, including being pivotably coupled to the hook portion by a pin proximate the distal end of the hook portion. Further, the latch member can be adapted for being selectively retained in at least one of an open position and a closed position. The latch member may generally define an L-shaped configuration and may comprise a first section and a second section extending generally perpendicularly from a central bend portion. When the latch member is in the closed position, the second section of the latch member may extend into the opening defined between the distal end of the hook portion and the attachment, and the first section of the latch member can engage an outer surface of the hook member. In one embodiment, when the latch member is in the closed position, the second section of the latch member may extend entirely into the opening. The mounting mechanism may optionally further comprise a magnet adapted for selectively retaining the latch member in at least one of the closed position and the open position. Further, the second section of the latch member may comprise a reduced thickness proximate a distal end of the second section, and the hook portion may comprise a recess capable of at least partially receiving the second section of the latch member when the latch member is in the open position.

Another embodiment of the present invention is directed to a system for connecting an attachment to industrial or construction equipment that may comprise an attachment operably coupled with the mounting mechanism.

Further, the present invention, according to one embodiment, is directed to a method for connecting an attachment to industrial or construction equipment that may comprise the steps of providing the mounting mechanism, interfacing a cross member connected to the equipment with a latch member of the mounting mechanism, receiving the cross member within an opening of the mounting mechanism, and rotating the latch member to the closed position to retain the cross member within the opening. The mounting mechanism may generally comprise a hook portion, an opening defined by the attachment and the hook portion, a locking mechanism with a rotatable latch member, and a magnet that can be adapted for selectively retaining the latch member in at least one of a closed position and an open position. The method for connecting an attachment to industrial or construction equipment may further comprise the steps of rotating the latch member to the open position and disengaging the cross member from the opening.

BRIEF DESCRIPTION OF THE SEVERAL VIEWS OF THE DRAWING

In the accompanying drawings, which form a part of the specification and are to be read in conjunction therewith in which like reference numerals are used to indicate like or similar parts in the various views:

FIG. 5 is a side view of a pin locking mechanism kit, comprising a bolt, a spring, and a mushroom cap as known in the prior art;

FIG. 17 is a rear view of the improved mounting mechanism of FIG. 8 illustrated as attached to the distal end of the vertical portion of a fork in accordance with one embodiment of the present invention.

DETAILED DESCRIPTION OF THE INVENTION

Figure 1:
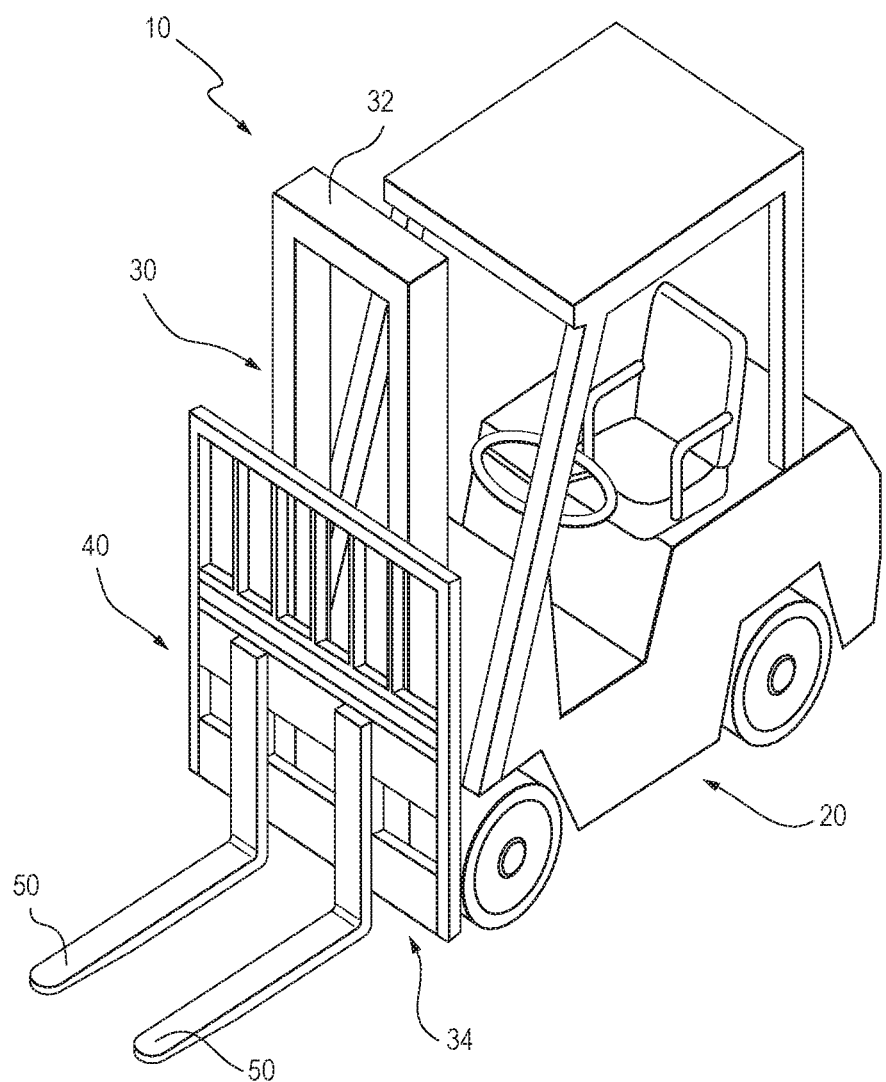
FIG. 1 is a perspective view of a forklift as known in the art.

Various embodiments of the present invention are described and shown in the accompanying materials, descriptions, instructions, drawings, and photographs. For purposes of clarity in illustrating the characteristics of the present invention, proportional relationships of the elements have not necessarily been maintained in the drawings and photographs. It will be appreciated that any dimensions included in the drawings are simply provided as examples and dimensions other than those provided therein are also within the scope of the invention.

The description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

One objective of the present invention is to provide a quick release mounting mechanism for mounting an attachment, such as a fork or other tool, to a forklift or other piece of industrial and construction equipment. One embodiment of the present invention is designed to (a) provide a means for lockably mounting an attachment to a carriage or lifting actuator that requires less human operation, (b) allow for a wide array of lifting equipment to connect and integrate, in a simple and cost-effective manner, with existing industrial and construction equipment without sacrificing loading capacity of the overall assembly, and (c) eliminate the need for complex devices and systems to retrofit existing industrial and construction equipment.

FIG. 1 depicts one of the most common pieces of industrial and construction material-moving equipment known in the art, a forklift 10. Forklifts 10 are widely used in factories and warehouses for moving objects which are loaded on a pallet (not shown), for example. Forklifts 10 generally comprise a motorized vehicle portion 20, a lift portion 30, a loading system 40, and elongated forks 50. The lift portion 30 of traditional forklifts 10 is vertically movable up and down by an operator of the forklift 10. The lift portion 30 commonly includes a mast 32, an actuator (not shown) that can be powered by a hydraulic cylinder (not shown), a lift carriage 34, and elongated forks 50 that extend outward from the front of the forklift 10.

Figure 2:
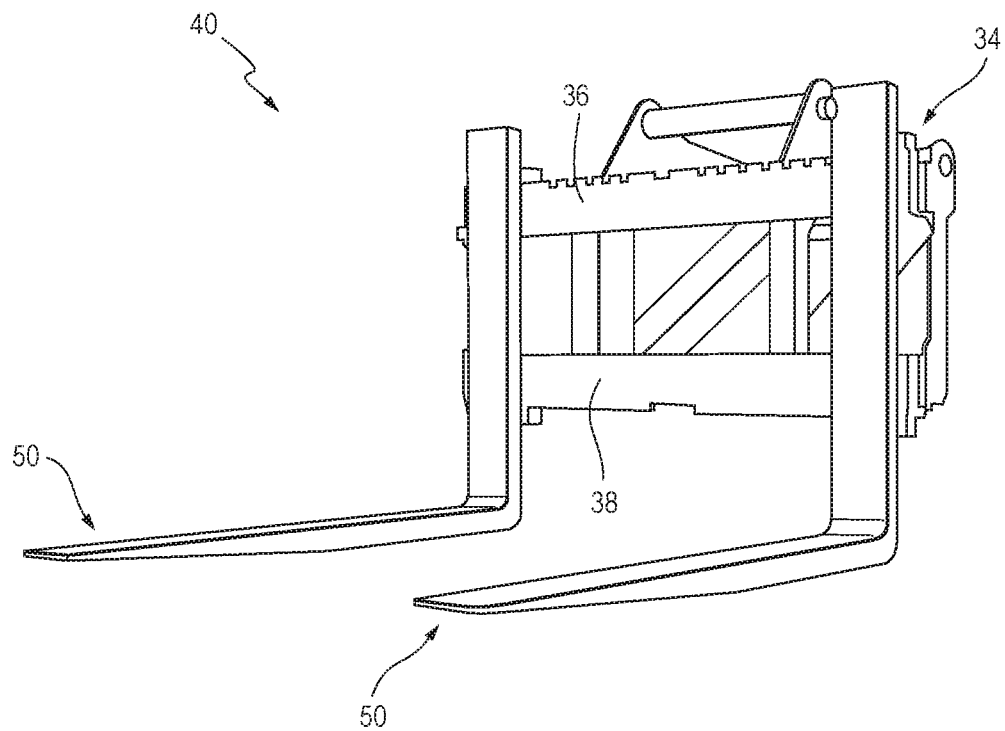
FIG. 2 is a perspective view of a loading system, comprising forks and a lift carriage as known in the art.

FIG. 2 depicts a loading system 40 for a forklift (not shown), generally comprising a pair of forks 50 attached to a lift carriage 34, as is known in the art. The forks 50 of the loading system 40 may be dimensioned to be received by a pallet (not shown), and this enables the forks 50 to, when raised along the mast 32 of the lift portion 30 of the forklift 10, as shown in FIG. 1, relative to the ground, lift the pallet and its associated contents. The lift carriage 34 may take many different forms, as will be recognized by those of ordinary skill in the art, but generally comprises an at least one structural cross bar 36, 38 extending in a lateral direction. As shown in FIG. 2, a first, upper cross bar 36 may support the forks 50. As further shown in FIG. 2, a second, lower cross bar 38 may be included to resist the rotational forces of the fork 50 relative to the first, upper cross bar 36.

Although FIG. 2 depicts the forks 50 being supported on the first, upper cross bar 36, it will be understood that it is possible for the second, lower cross bar 38 to support the forks 50 in the same or similar manner. Given that substantial load will normally be supported by the cross bars 36, 38, each cross bar 36, 38 is preferably made of solid steel or other metal which is sufficiently strong to bear the loads that are likely to be encountered thereby. The elongated forks 50, when attached to the at least one cross bar 36, 38, extend away from the lift carriage 34 and the at least one cross bar 36, 38.

Figure 3:
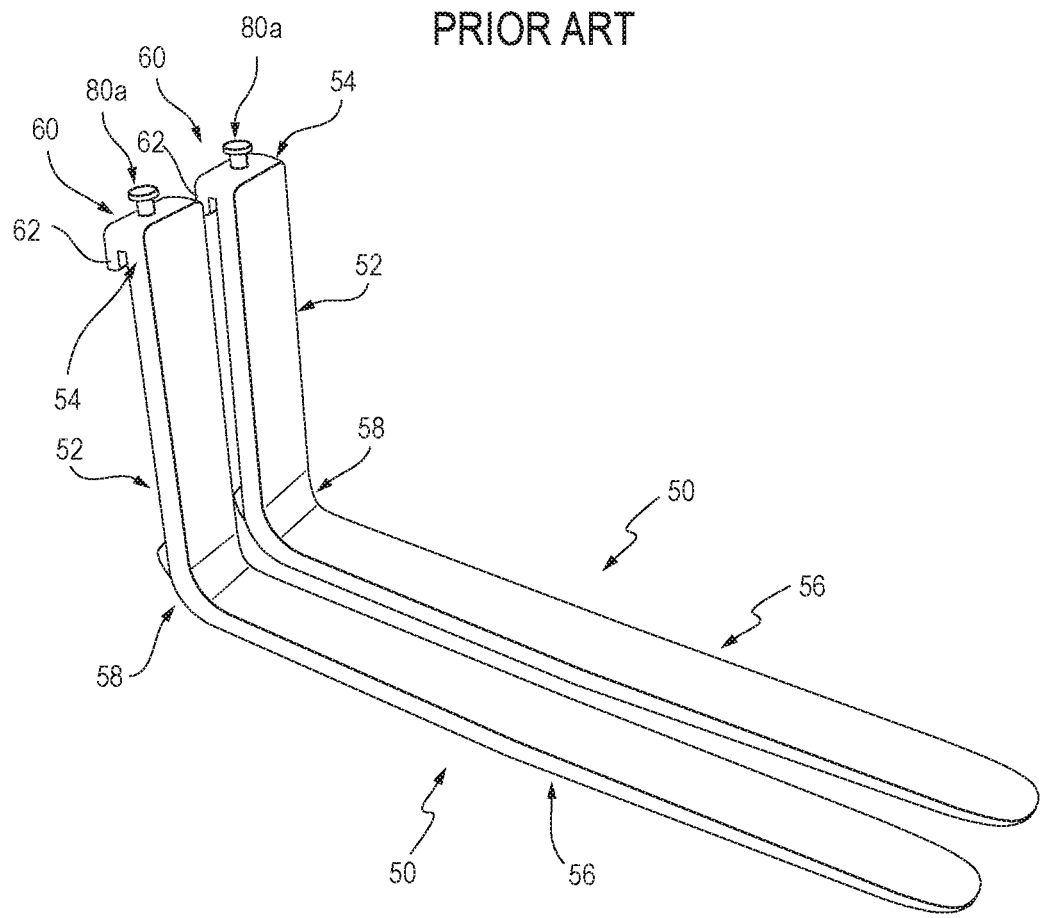
FIG. 3 is a perspective view of a pair of forks as known in the art.

As shown in FIG. 3, the forks 50 are preferably substantially L-shaped having a substantially vertical portion 52, with a distal end 54, and a substantially horizontal portion 56 separated by a bend or heel 58. A mounting mechanism 60 is attached to the distal end 54 of the vertical portion 52 of the fork 50. The mounting mechanism 60 generally comprises a hook portion 62 and locking mechanism 80a. The hook portion 62 is adapted for receiving an at least one cross bar (now shown) of a carriage (not shown) and the locking mechanism 80a secures the fork 50 to the at least one cross bar.

Figure 4:
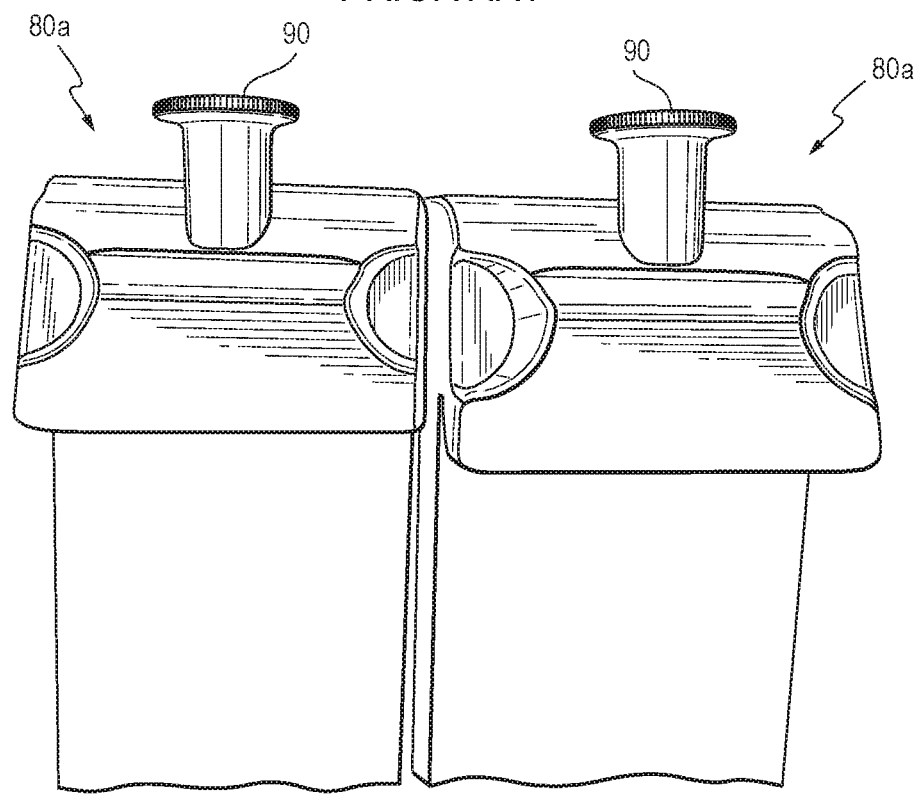
FIG. 4 is a rear view of a pair of pin locking mechanisms that may be attached to the distal end of the vertical portion of a fork as known in the art.
Figure 6:
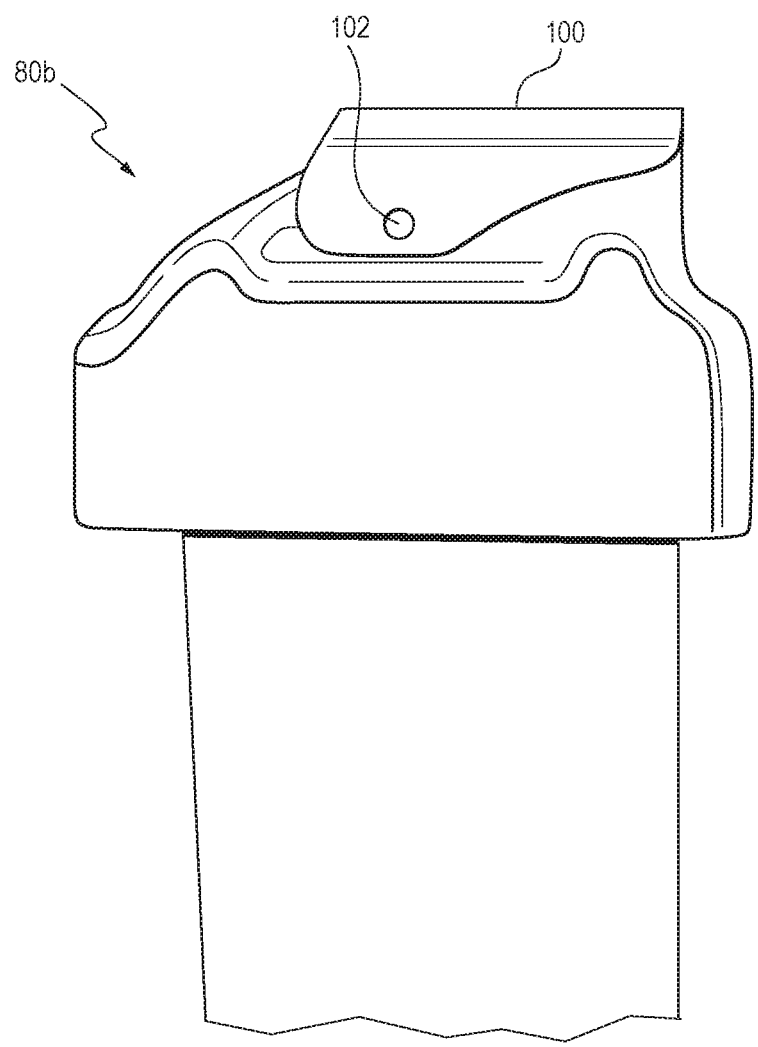
FIG. 6 is a rear view of another locking mechanism that may be attached to the distal end of the vertical portion of a fork as known in the art.
Figure 7:
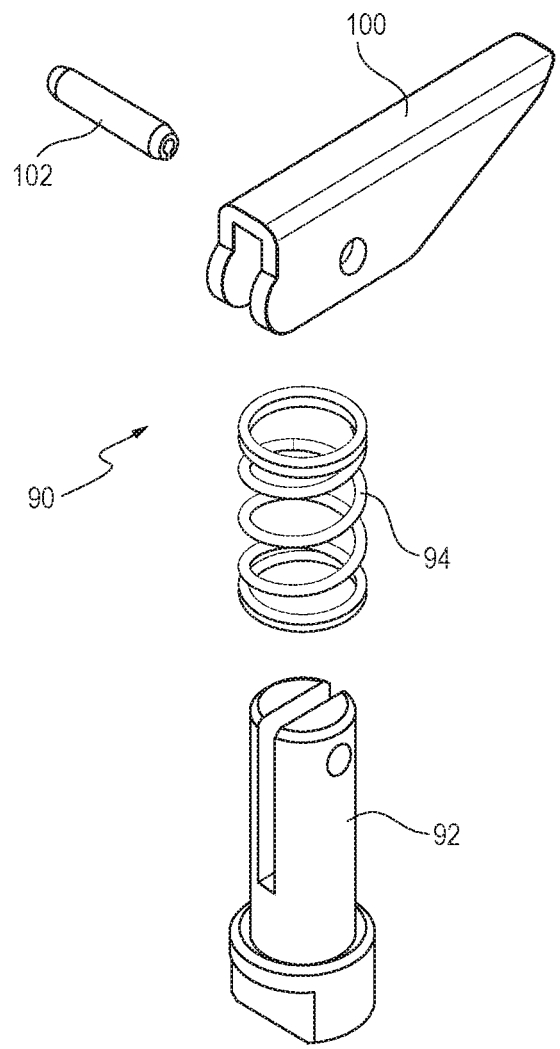
FIG. 7 is an exploded view of the locking mechanism assembly of FIG. 6, comprising a bolt, a spring, a handle, and a pin as known in the art.

FIGS. 4-7 illustrate previously known locking mechanisms 80a, 80b of mounting mechanism 60 adapted for attaching forks (partially shown) to an at least one cross bar (not shown). FIGS. 4 and 5 illustrate a pin locking mechanism 80a in which a fastening device 90, such as a pin, screw, or a retractable plunger, may be manually selectively tightened or loosened, which enables an operator to selectively and securely connect and disconnect the attachment (partially shown) to a lift carriage (not shown). As best shown in FIG. 5, the pin locking mechanism 80a fastening device kit 90 generally comprises a bolt 92, a spring 94, and a mushroom cap 96. FIGS. 6 and 7 illustrate another locking mechanism 80b fastening device generally comprising, as best shown in FIG. 7, a bolt 92, a spring 94, a handle 100, and a pin 102. Locking mechanism 80b can be generally operated in a similar manner to locking mechanism 80a to achieve the same result. Therefore, as demonstrated in FIGS. 4-7, typical detachable attachments (partially shown) can be manually connected and disconnected to the lift carriage, which requires an operator to engage and disengage the locking mechanisms 80a, 80b.

FIGS. 8-13 depict perspective views of an improved mounting mechanism 60' according to one embodiment of the present invention. The improved mounting mechanism 60' may generally comprise an improved hook portion 62' and an improved locking mechanism 80'. The hook portion 62' may comprise a proximal end 64 affixed or otherwise attached to an attachment (partially shown) and a free distal end 66 that generally defines a generally vertical section 68. In one embodiment, the improved locking mechanism 80' can be attached to the distal end 66 of the hook portion 62'. Although FIGS. 8-13 depict the proximal end 64 of the hook portion 62' as being affixed or otherwise attached to a lateral face of the attachment, it will be appreciated that the hook portion 62' and the proximal end 64 thereof can be designed, arranged, and configured so that the proximal end 64 can be affixed or otherwise attached to various faces of the attachment, including, without limitation, a top face of the distal end of the partially depicted attachment or the bottom face of a hook-shaped distal end of the attachment (not shown).

Figure 10:
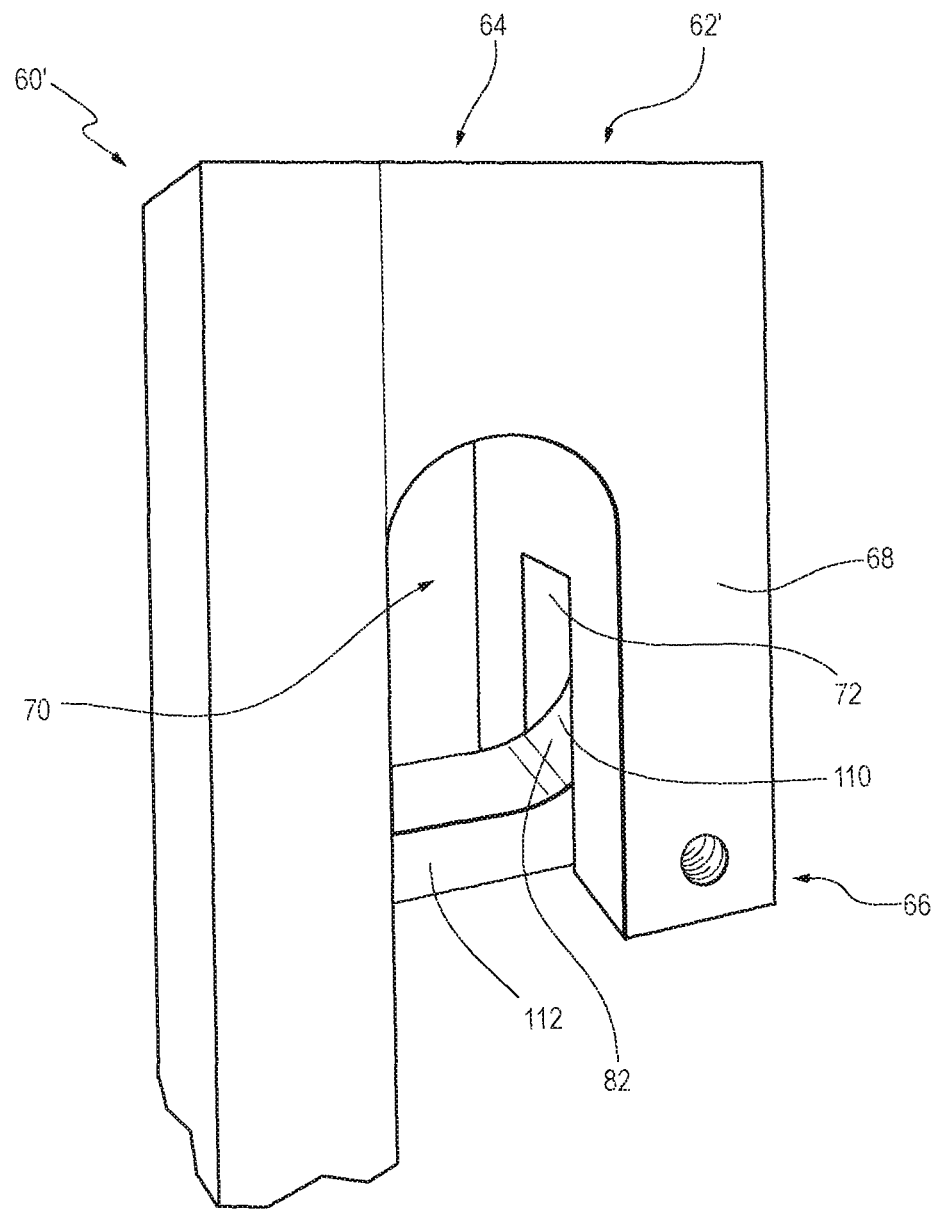
FIG. 10 is a perspective view of the improved mounting mechanism of FIG. 8 illustrating the latch member positioned in a closed orientation in accordance with one embodiment of the present invention.

The hook portion 62' may define an opening 70 between the distal end 66 and/or the generally vertical section 68 and the attachment. The at least one cross bar (not shown) fixedly attached to a lift carriage (not shown), or other suitable member, may be selectively inserted in the opening 70 of the improved mounting mechanism 60' without removing or moving elements of the lift carriage. Further, it will be appreciated that the improved hook portion 62' will be made of material at least sufficient to withstand vertical forces commonly demanded in the industrial and construction industry. Further, as best illustrated in FIG. 10, the generally vertical section 68 of the hook portion 62' of the improved mounting mechanism 60' may comprise a recess 72.

Figure 8:
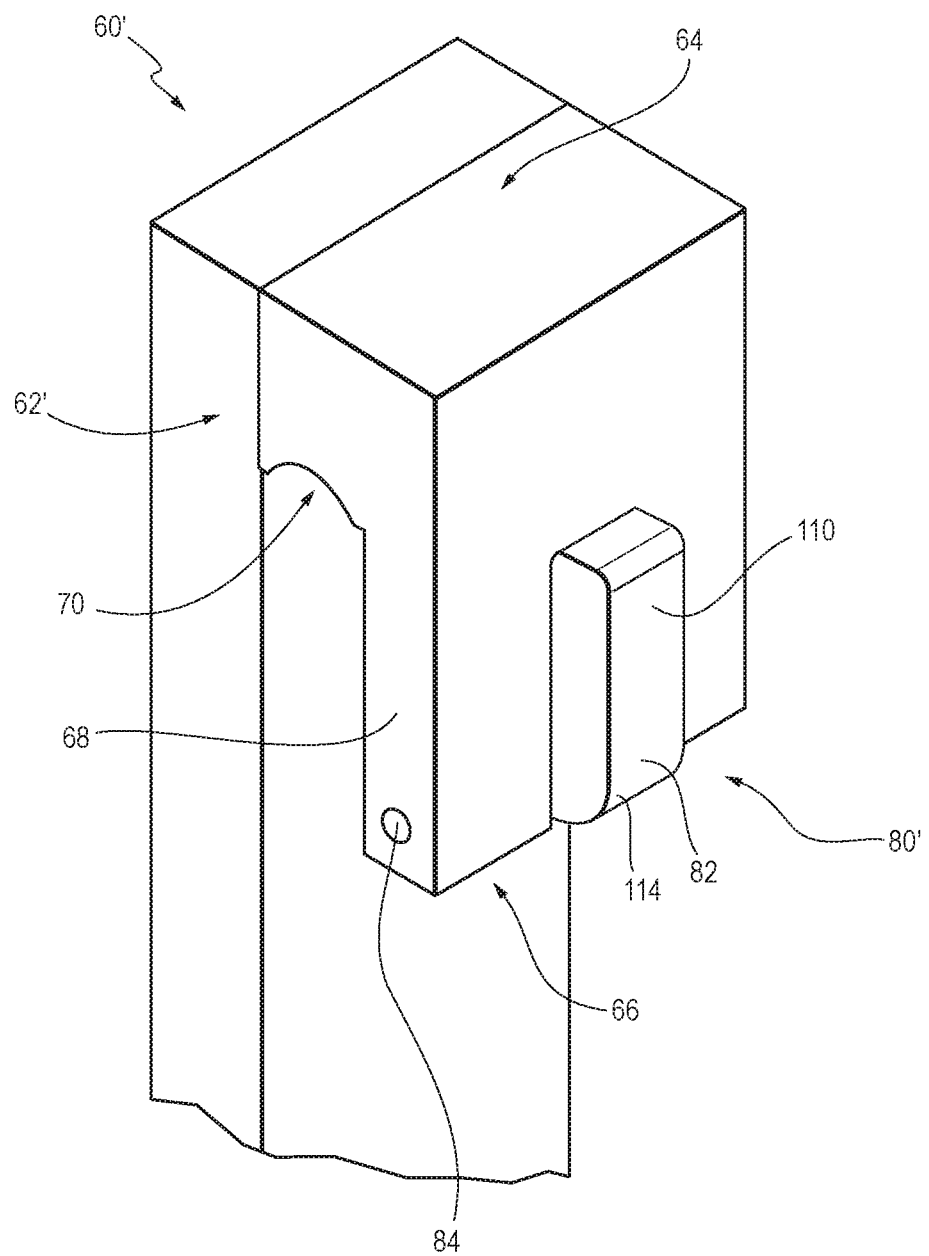
FIG. 8 is a perspective view of an improved mounting mechanism with a latch member positioned in a closed orientation in accordance with one embodiment of the present invention.
Figure 9:
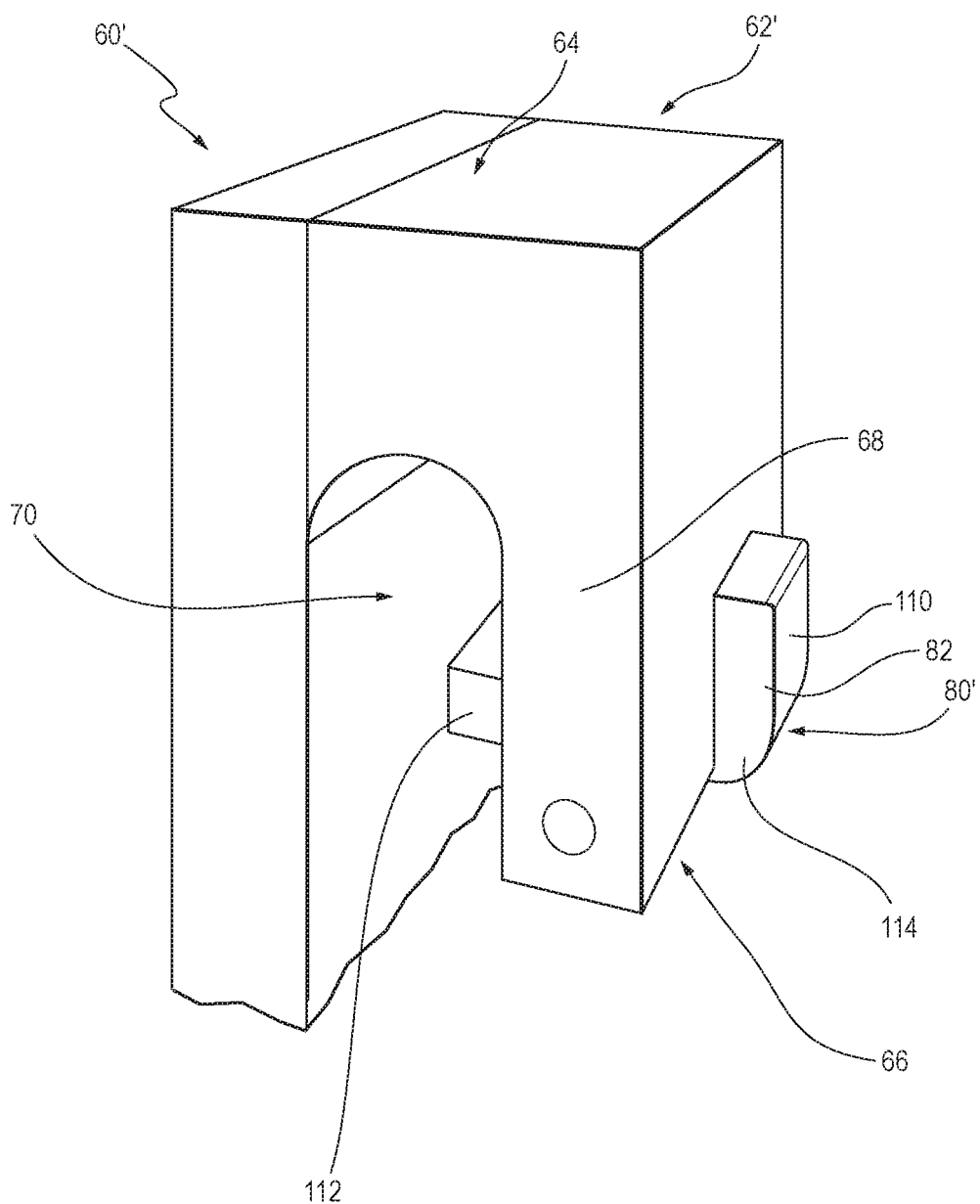
FIG. 9 is a perspective view of the improved mounting mechanism of FIG. 8 illustrating the latch member positioned in a closed orientation in accordance with one embodiment of the present invention.

The improved locking mechanism 80' may comprise a pivotable latch member 82, a pin 84, and one or more magnets 86, wherein the latch member 82 may be selectively and adjustably biased to a closed or opened position or orientation by the forces of one or more of the magnets 86. The recess 72 of the vertical section 68 may be capable of fully or partially receiving the latch member 82 or any portion thereof; for example, this would include a second section 112 of the latch member 82 when the latch member 82 is positioned in the open orientation. In FIGS. 8-10, the latch member 82 is illustrated as being positioned in a closed position or orientation. In FIG. 11-14, the latch member 82 is illustrated as being positioned in an open position or orientation.

As best shown in FIGS. 8-14, the pivotable latch member 82 can be selectively and adjustably biased in either the open orientation or the closed orientation by forces acting upon the latch member 82 relative to a fulcrum or pivot point, which can be a pin 84 pivotably coupled thereto. The pin 84 of the improved locking mechanism 80' may be disposed in or around the improved hook portion 62' proximate the distal end 66 thereof. In one embodiment, the pin 84 may be located in a position so that when the latch member 82 is in a closed orientation (see FIGS. 8-10 and 15-16), as best illustrated in FIG. 15, the center of center of gravity of the latch member 82 is located in front of—or, relative to the configuration depicted in FIG. 15, to the left of—the center axis of the pin 84, thereby keeping the latch member 82 in its closed orientation under the force of gravity. Further, as discussed in further detail below, a magnet 86 may optionally be provided to further selectively retain the latch member 82 in its closed position or orientation. Similarly, the pin 84 may likewise be located in a position so that when the latch member 82 is in an open orientation (see FIGS. 11-14), the center of center of gravity of the latch member 82 is located behind the center axis of the pin 84, thereby keeping the latch member 82 in its open orientation under the force of gravity. Again, a magnet 86 may optionally be provided to further selectively retain the latch member 82 in its open position or orientation.

It will be understood that a magnet 86 can be used to selectively retain the latch member 82 in an open orientation or closed orientation through attracting magnetic forces or repelling magnetic forces. For example, in the closed orientation, the magnet 86 can be adapted to magnetically attract a first section 110 of the latch member 82 and/or repel a second section 112 of the latch member 82. Further, in the open orientation, the magnet 86 can be adapted to magnetically attract a second section 112 of the latch member 82 and/or repel a first section 110 of the latch member 82. Accordingly, the forces acting on the latch member 82 to retain it in a desired orientation can include magnetic forces, gravitational forces, spring forces, other suitable forces, or any combination thereof. Preferably, the forces acting upon the latch member 82 to bias its orientation can be overcome, so as to influence the orientation of the latch member 82 relative to its biased orientation, by the application of opposing rotational forces relative to the pin 84 that are at least non-negligible. It will be appreciated that the counteracting nature of opposing forces acting on the latch member 82 may allow for the latch member 82 to be balanced in a manner that it may be disturbed from its biased position with at least a non-negligible disturbing force.

Figure 11:
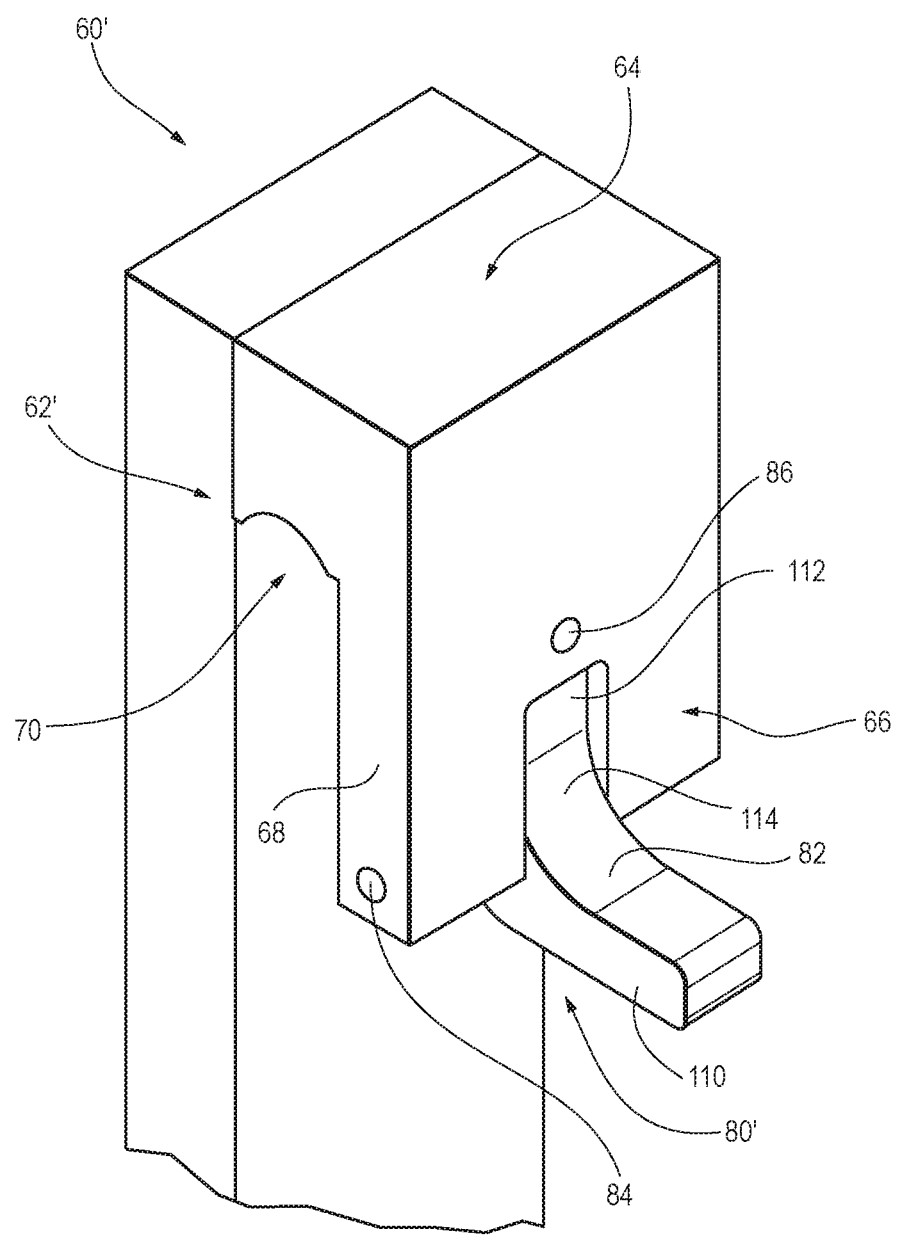
FIG. 11 is a perspective view of the improved mounting mechanism of FIG. 8 illustrating the latch member positioned in an open orientation in accordance with one embodiment of the present invention.
Figure 12:
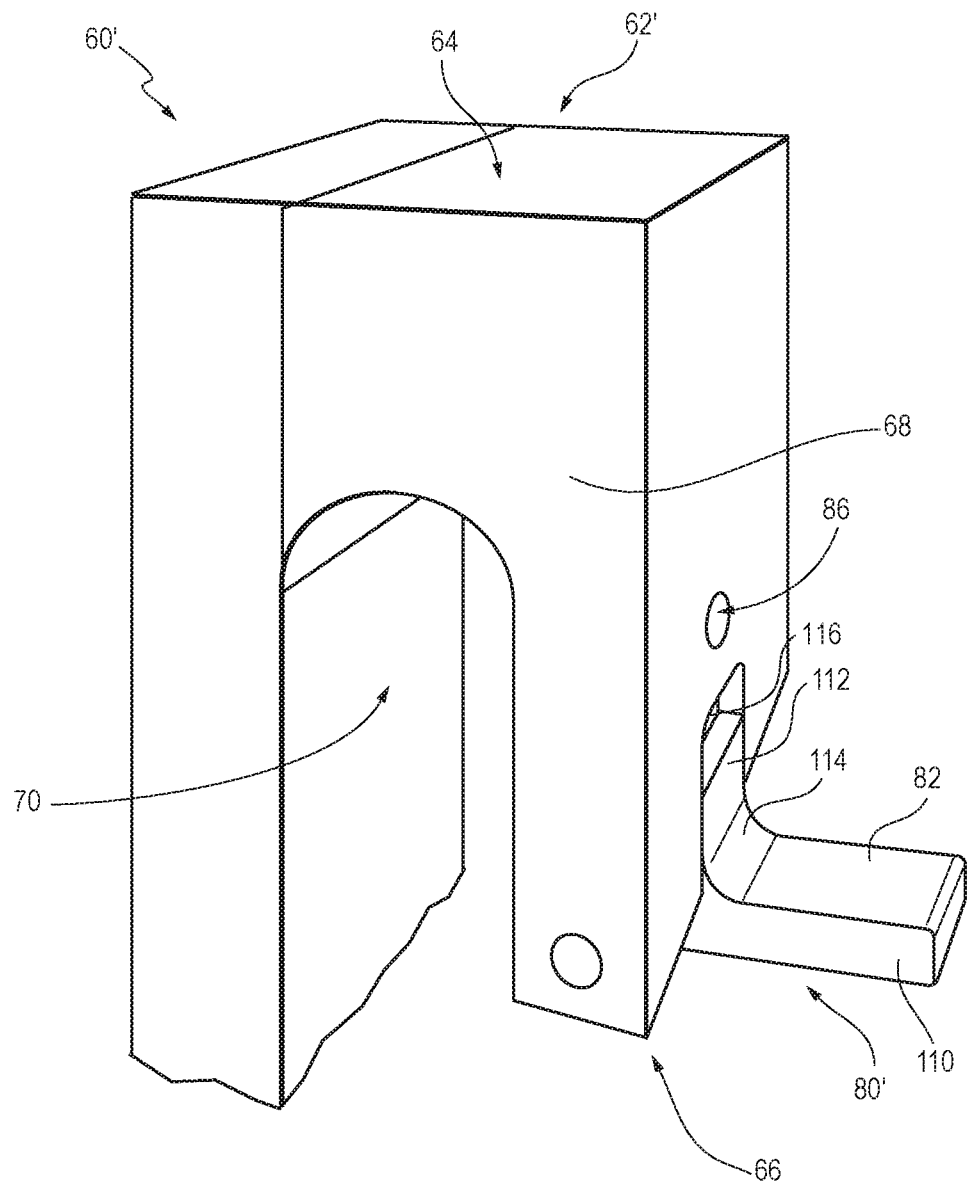
FIG. 12 is a perspective view of the improved mounting mechanism of FIG. 8 illustrating the latch member positioned in an open orientation in accordance with one embodiment of the present invention.

FIGS. 11-12 best illustrate the use of a magnet 86 with the improved mounting mechanism 60' as a means for biasing the pivotable latch member 82 according to one embodiment. It will be understood that, in one embodiment, the magnet 86 may be a neodymium magnet made from an alloy of neodymium, iron, and boron. It will be appreciated, however, that the magnet 86 can be any magnet and may be made of any magnetic material, including any combination diamagnetic, paramagnetic, ferromagnetic, and antiferromagnetic materials. The magnet 86 may alternatively be an electromagnet. In another embodiment, the latch member 82 may, but need not, include an additional, complementary magnet (not shown) positioned to couple with the magnet 86 or the hook portion 62'. In an additional embodiment, wherein the magnet 86 is coupled with the complementary magnet, the magnet 86 may be capable of selectively reversing polarity so that it is capable of selectively attracting or repelling the complementary magnet. In another embodiment, a magnet is not provided on the vertical section 68, but one or more magnets are provided on the first section 110 and/or second section 112 of the latch member 82.

Figure 13:
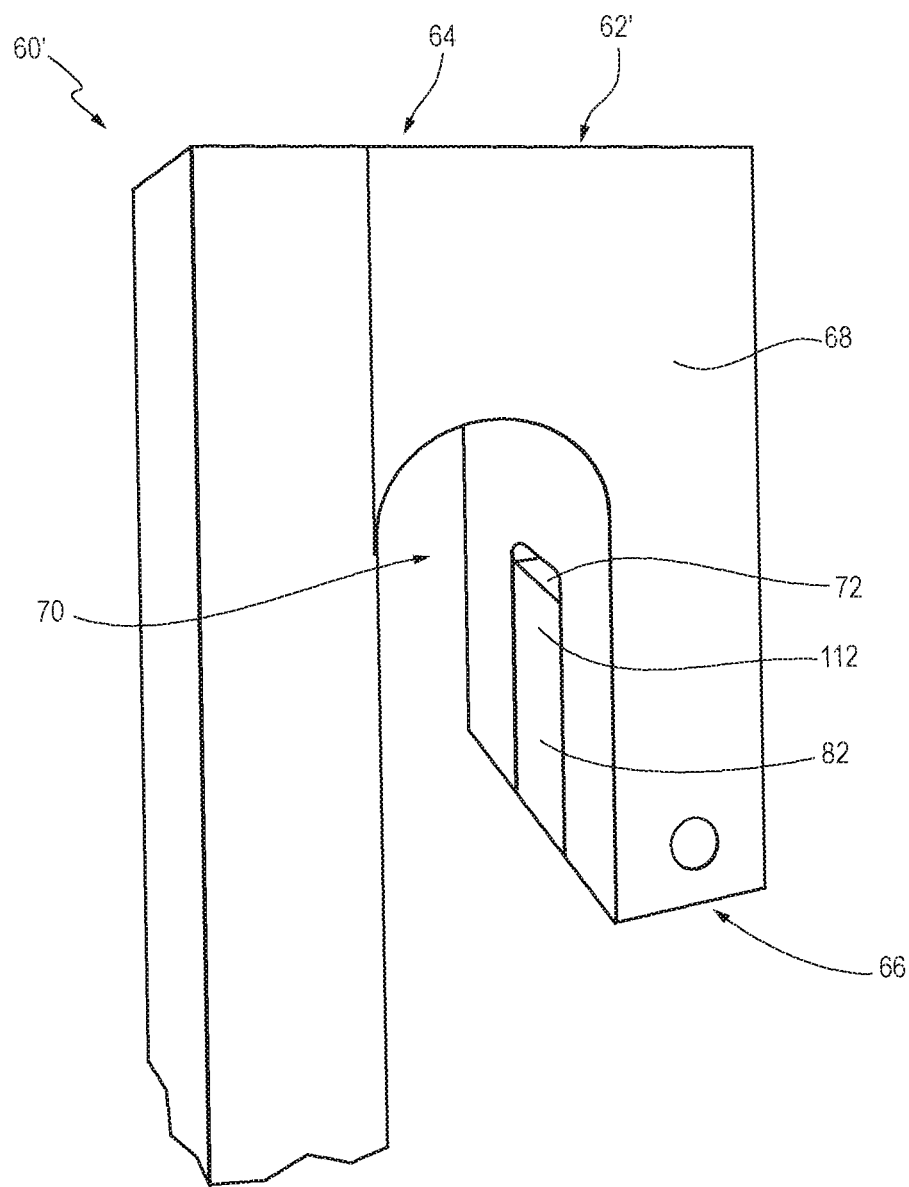
FIG. 13 is a perspective view of the improved mounting mechanism of FIG. 8 illustrating the latch member positioned in an open orientation in accordance with one embodiment of the present invention.

In one embodiment, as best illustrated in FIG. 13, when the latch member 82 is in the open orientation and the latch member 82, or any portion thereof, is received in the recess 72 of the vertical section 68 of the hook portion 62', the latch member 82, or the portion thereof received in the recess 72, can be substantially flush or coplanar with the surrounding hook portion 62' while also further defining the opening 70 between the generally vertical section 68 of the hook portion 62' and the attachment (partially shown) in conjunction with the surrounding hook portion 62'. In other embodiments (not shown), the second section 112 of the latch member 82 may be fully received within the recess 72 such that it is set back from the inner surface of the vertical section 68.

Figure 14:
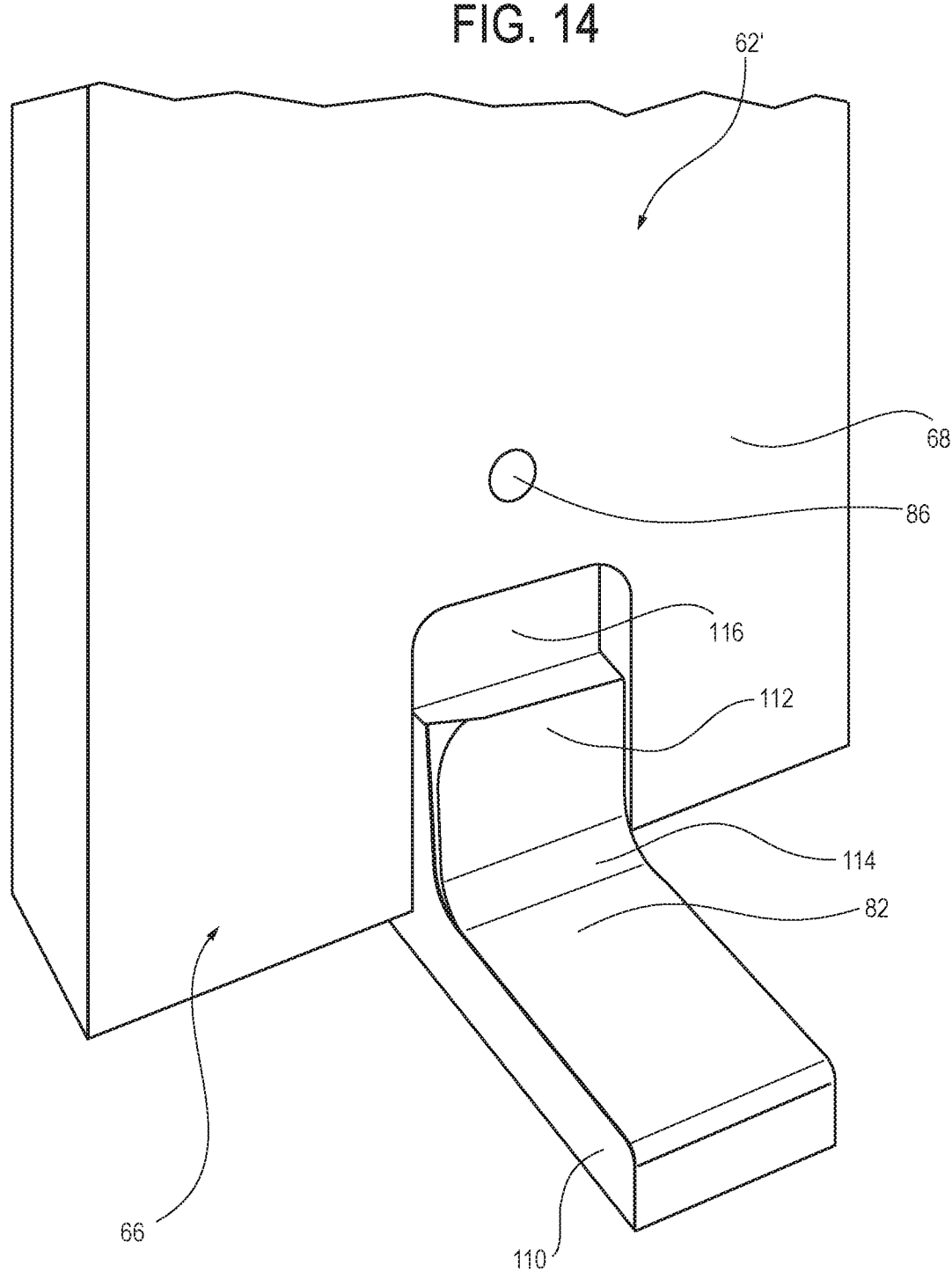
FIG. 14 is an enlarged perspective view of the of the latch member of the improved mounting mechanism of FIG. 8 positioned in an open orientation in accordance the one embodiment of the present invention.
Figure 15:
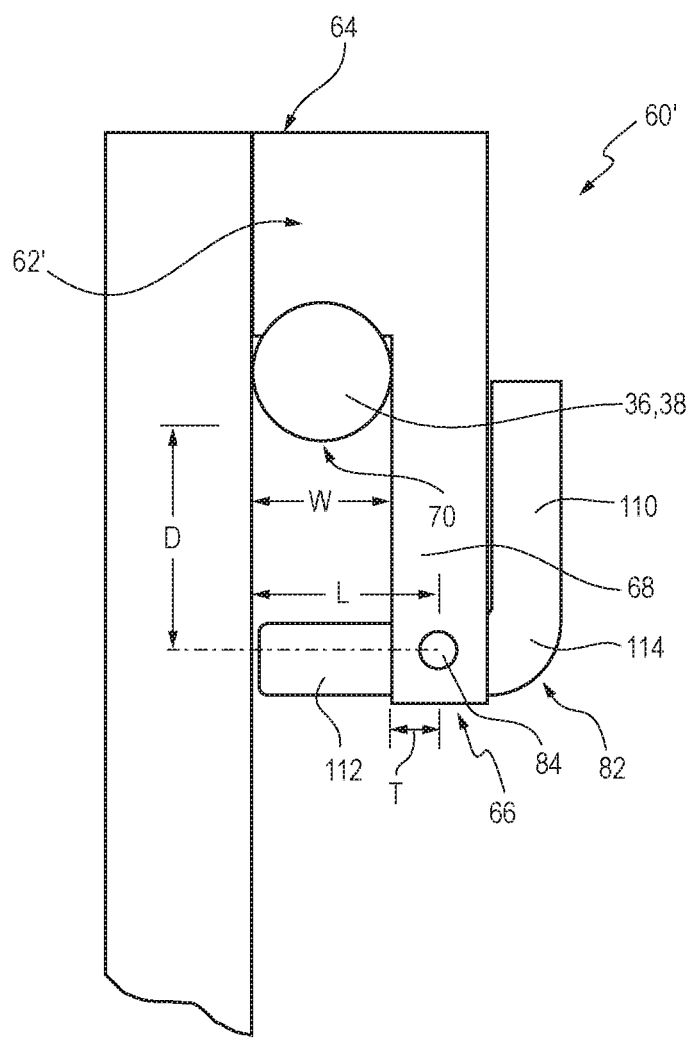
FIG. 15 is a partial schematic side view of the improved mounting mechanism of FIG. 8 and a cross section of a cross bar in accordance with one embodiment of the present invention.

As shown in FIG. 14, the latch member 82 may be L-shaped and can include a first section 110 and a second section 112 extending generally perpendicularly from a central bend portion 114. As best shown in FIG. 15, the length L of the second section 112 (as measured from a center axis of the pin 84 to the distal end of the second section 112) may be such that the second section 112 extends at least partially into the opening 70 of the hook portion 62' when the latch member 82 is in its closed orientation. In another embodiment, the length L of the second section 112 (as measured from a center axis of the pin 84 to the distal end of the second section 112) may be such that the second section 112 extends entirely into the opening 70 of the hook portion 62' when the latch member 82 is in its closed orientation, such that the distal end of the second section 112 flushly engages the portion of the attachment or the hook portion 62' directly opposite of the latch member 82. In one embodiment, the length L of the second section 112 is equal to or less than the width W of the opening 70 combined with the thickness T between the center axis of the pin 84 and the closest inner edge of the improved hook portion 62' defining the opening 70. Similarly, the length L of the second section 112 should be such that a second section 112 may pass by the at least one cross bar 36, 38 when the latch member 82 is rotated between closed and open orientations, and vice versa. In one embodiment, the length L of the second section 112 is equal to or less than the distance D between the center axis of the pin 84 and the at least one cross bar 36, 38.

Further, as partially illustrated in FIGS. 12 and 14, the second section 112 of the latch member 82 may comprise an area 116 of optionally reduced thickness at or near its distal end. As best illustrated in FIG. 14, this optionally reduced thickness of the second section 112 may be used to assist with receiving the latch member 82, or any portion thereof, into the recess 72 of the hook portion 62' of the improved mounting mechanism 60'.

FIG. 15 illustrates an improved mounting mechanism 60' engaged by and receiving an at least one cross bar 36, 38 with a generally circular cross section. It will be appreciated that the received cross bar 36, 38 may have any suitable cross sectional shape. In one embodiment, the attachment (partially shown) may be mounted to the equipment via the improved mounting mechanism 60' in such a manner that the attachment may be pivotally mounted relative to the cross bar 36, 38—such that the attachment can freely rotate about the pivot point defined by the cross bar 36, 38. In another embodiment, the attachment may be mounted such that it is generally fixed and restricted from rotating relative to the cross bar 36, 38 or a carriage (not shown). It will be appreciated that the improved mounting mechanism 60' may be adapted for permitting an attachment to be moved laterally (e.g., forks may be moved laterally in order to adjust the spacing between the forks). It will also be understood that, in one embodiment, the improved mounting mechanism 60' may be designed to restrict both the lateral and the rotational movement of the attachment or attachments.

Further, as best illustrated in FIG. 15, in conjunction with the hook portion 62', the latch member 82 may lockably retain and serve to ensure that the at least one cross bar 36, 38 does not disengage from the attachment in the event that there is an atypical movement overcoming the forces otherwise engaging the at least one cross bar 36, 38 to the hook portion 62'. In FIG. 15, the latch member 82 is shown in its biased closed orientation, and because of the counteracting forces acting upon the latch member 82, the received cross bar 36, 38 cannot disengage from the attachment without disturbing the biased latch member 82. In other words, if the received cross bar 36, 38 were to come into contact with the second section 112 of the latch member 82, the latch member 82 would be prohibited from rotating, as the first section 110 of the latch member 82 would be engaged against the vertical section 68, or an outer surface thereof, of the hook 62'.

Figure 16:
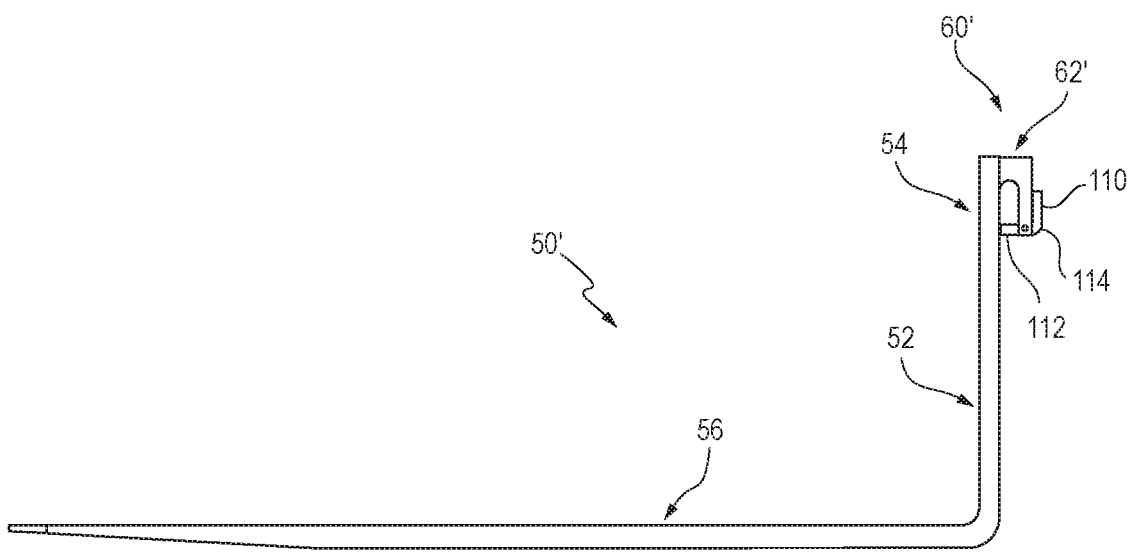
FIG. 16 is a side view of the improved mounting mechanism of FIG. 8 illustrated as being attached to the distal end of the vertical portion of a fork in accordance with one embodiment of the present invention.

FIG. 16 depicts an improved fork 50' that includes an improved mounting mechanism 60' attached to the distal end 54 of the substantially vertical portion 52 of the fork 50'. The improved hook portion 62' of the improved mounting mechanism 60' may be formed as a unitary component with the fork 50'. In other embodiments, the improved hook portion 62' may be affixed or otherwise attached to the fork 50', for example, through welds, bolts, pins, or other suitable attachment means. It will be appreciated that a single improved mounting mechanism 60' may be attached to more than one fork 50'.

FIG. 17 depicts an improved fork 50' and an improved mounting mechanism 60' according to one embodiment of the present invention. As best illustrated in FIG. 17, the improved mounting mechanism 60' may be substantially as wide as the working face of the elongated fork 50', but it will be appreciated that the improved mounting mechanism 60' can be wider or narrower if required.

In operation, the pivotable latch member 82 may be biased in a closed orientation. Then, when a yet-to-be-received cross member, such as an at least one cross bar 36, 38 or other longitudinal member, interfaces with the pivotable latch member 82 biased in the closed orientation, the latch member 82 can release from its closed orientation. During this release of the latch member 82, the cross member can pass by the pivotable latch member 82 into the opening 70 of the hook portion 62'. More specifically, in one embodiment, the improved mounting mechanism 60' is adapted for permitting an attachment to be mounted to a piece of equipment, such as a forklift 10, via the improved mounting mechanism 60' with little to no operator interaction with the improved mounting mechanism 60'. In that mounting operation, the carriage 34 may be positioned such that an at least one cross bar 36, 38 is located just beneath the improved mounting mechanism 60'. The latch member 82 may be in either a closed orientation or an open orientation. The carriage 34 may then be raised so that the cross bar 36, 38 may be received within the opening 70. If the latch member 82 is in its closed orientation, the cross bar 36, 38 can engage the second section 112 of the latch member 82 thereby rotating the latch member 82 toward an open orientation as the carriage 34 is raised. Once the cross bar 36, 38 has passed by the second section 112 of the latch member 82, the latch member 82 may be rotated back to its closed orientation in order to retain the cross bar 36, 38 within the opening 70. It will be appreciated that, in one embodiment, the latch member 82, when in its closed orientation, may only partially extend into the opening 70 of the hook portion 62' and adequately retain the cross bar 36, 38 within the opening 70. That rotation of the latch member 82 back to its closed orientation may occur automatically as a result of a gravitational force or other force, or may be influenced by an operator.

The process of unmounting an attachment from a piece of equipment, such as a forklift 10, may be equally as simple. In one embodiment, the latch member 82 can rotated from its closed orientation to an open orientation in order to allow the received cross member, such as an at least one cross bar 36, 38 or other longitudinal member, to pass by the latch member 82 and be disengaged from the opening 70. It will be appreciated that the second section 112 of the latch member 82 may be partially or fully recessed and received within the vertical section 68 of the hook 62' via the recess 72, such that the cross member may pass thereby without impediment as it is being lowered through the opening 70. Accordingly, the vertical section 68 of the hook 62' may include a slot, depression, recess 72, or the like defined therein that is suitable for receiving at least a portion of the second section 112 of the latch member 82 when the latch member 82 is in its open orientation. The latch member 82 can be retained in its open orientation as a result of one or more forces, such as a magnetic force, gravitational force, spring force, other suitable force, or any combination thereof.

It will be appreciated that, in one embodiment, the process of mounting or unmounting an attachment from a piece of equipment can be achieved while the improved mounting mechanism 60' is generally perpendicular to the ground via the length of the attachment or while the attachment is generally vertical to the ground.

From the accompanying materials, it will be seen that the invention is one well adapted to attain all the ends and objects set forth herein with other advantages which are obvious and which are inherent to the structure. It will be understood that certain features and sub combinations are of utility and may be employed without reference to other features and sub-combinations. This is contemplated by and is within the scope of the claims. Since many possible embodiments of the invention may be made without departing from the scope thereof, it is also to be understood that all matters herein set forth or shown in the accompanying drawings and photographs are to be interpreted as illustrative and not limiting.

The constructions described in the accompanying materials and illustrated in the drawings and photographs are presented by way of example only and are not intended to limit the concepts and principles of the present invention. Thus, there has been shown and described several embodiments of a novel invention. As is evident from the description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required." Many changes, modifications, variations and other uses and applications of the present construction will, however, become apparent to those skilled in the art after considering the specification and the accompanying drawings and photographs. All such changes, modifications, variations, and other uses and applications which do not depart from the spirit and scope of the invention are deemed to be covered by the invention which is limited only by the claims which follow.

What is claimed is:

1. A mounting mechanism for connecting an attachment to industrial or construction equipment, the mounting mechanism comprising:
   a hook portion comprising a proximal end affixed to the attachment and a free distal end;
   an opening defined between the distal end of the hook portion and the attachment; and
   a locking mechanism attached to the distal end of the hook portion, the locking mechanism comprising a rotatable latch member;
   wherein the latch member is selectively movable between:
      an open position so that a cross member connected to the equipment can be received within the opening; and
      a closed position so that the cross member is retained within the opening;
   wherein the latch member is selectively rotatable about a pivot point having a center axis;
   wherein a center of gravity of the latch member is located on one side of the center axis when the latch member is in the closed position, thereby retaining the latch member in the closed position under a force of gravity;
   wherein the center of gravity of the latch member is located on another, opposing side of the center axis when the latch member is in the open position, thereby retaining the latch member in the open position under the force of gravity.

2. The mounting mechanism of claim 1, wherein the latch member is pivotably connected to the hook portion.

3. The mounting mechanism of claim 1, wherein the latch member is pivotably coupled to the hook portion by a pin proximate the distal end of the hook portion.

4. The mounting mechanism of claim 1, wherein the latch member is adapted for being selectively retained in the closed position.

5. The mounting mechanism of claim 1, wherein the latch member is adapted for being selectively retained in the open position.

6. The mounting mechanism of claim 1 further comprising a magnet adapted for selectively retaining the latch member in at least one of the closed position and the open position.

7. The mounting mechanism of claim 1, wherein the latch member is generally L-shaped and comprises a first section and a second section extending generally perpendicularly from a central bend portion.

8. The mounting mechanism of claim 7, wherein, when the latch member is in the closed position, the second section of the latch member extends into the opening, and the first section of the latch member engages an outer surface of the hook portion.

9. The mounting mechanism of claim 8, wherein, when the latch member is in the closed position, the second section of the latch member extends entirely into the opening.

10. The mounting mechanism of claim 7, wherein:
the second section of the latch member comprises a reduced thickness proximate a distal end of the second section; and
the hook portion comprises a recess capable of at least partially receiving the second section of the latch member when the latch member is in the open position.

11. A system for connecting an attachment to industrial or construction equipment, the system comprising:
an attachment; and
a mounting mechanism comprising:
a hook portion comprising a proximal end affixed to the attachment and a free distal end;
an opening defined between the distal end of the hook portion and the attachment; and
a locking mechanism attached to the distal end of the hook portion, the locking mechanism comprising a rotatable latch member;
wherein the latch member is selectively movable between:
an open position so that a cross member connected to the equipment can be received within the opening; and
a closed position so that the cross member is retained within the opening;
wherein the latch member is generally L-shaped and comprises a first section and a second section extending generally perpendicularly from a central bend portion;
wherein the latch member is pivotably coupled to the hook portion by a pin proximate the distal end of the hook portion;
wherein the latch member is adapted for being selectively retained in the closed position;
wherein, when the latch member is in the closed position, the second section of the latch member extends entirely into the opening, and the first section of the latch member engages an outer surface of the hook portion.

12. The system of claim 11 further comprising a magnet adapted for selectively retaining the latch member in at least one of the closed position and the open position.

13. A method for connecting an attachment to industrial or construction equipment, the method comprising the steps of:
providing a mounting mechanism having front and rear sides and comprising:
a hook portion comprising a proximal end affixed to the attachment and a free distal end;
an opening defined between the distal end of the hook portion and the attachment; and
a locking mechanism attached to the distal end of the hook portion, the locking mechanism comprising a rotatable latch member;
wherein the latch member is selectively rotatable about a pivot point having a center axis between:
an open position; and
a closed position;
interfacing a cross member connected to the equipment with the latch member;
receiving the cross member within the opening; and
rotating the latch member to the closed position to retain the cross member within the opening;
wherein a center of gravity of the latch member is located in front of the center axis when the latch member is in the closed position, thereby retaining the latch member in the closed position under a force of gravity;
wherein a center of gravity of the latch member is located behind the center axis when the latch member is in the open position, thereby retaining the latch member in the open position under a force of gravity.

14. The method of claim 13 further comprising the steps of:
rotating the latch member to the open position; and
disengaging the cross member from the opening.

* * * * *